United States Patent
Morinaga et al.

(10) Patent No.: US 9,234,478 B2
(45) Date of Patent: Jan. 12, 2016

(54) DIESEL ENGINE FOR AUTOMOBILE, CONTROL DEVICE AND CONTROL METHOD

(75) Inventors: Shinichi Morinaga, Hiroshima (JP); Daisuke Shimo, Hiroshima (JP); Keiji Maruyama, Hiroshima (JP); Hiroshi Minamoto, Hiroshima (JP); Naotoshi Shirahashi, Hiroshima (JP); Daisuke Fukuda, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 685 days.

(21) Appl. No.: 13/696,776

(22) PCT Filed: May 9, 2011

(86) PCT No.: PCT/JP2011/002571
§ 371 (c)(1),
(2), (4) Date: Nov. 7, 2012

(87) PCT Pub. No.: WO2011/142112
PCT Pub. Date: Nov. 17, 2011

(65) Prior Publication Data
US 2013/0073186 A1    Mar. 21, 2013

(30) Foreign Application Priority Data
May 11, 2010  (JP) .................................. 2010-109219

(51) Int. Cl.
*F02D 41/40*  (2006.01)
*F02D 13/02*  (2006.01)
(Continued)

(52) U.S. Cl.
CPC .......... *F02D 41/403* (2013.01); *F02D 13/0207* (2013.01); *F02D 13/0246* (2013.01);
(Continued)

(58) Field of Classification Search
CPC . F02D 41/403; F02D 41/3035; F02D 41/402; F02D 13/0246; F02D 13/0207; F02D 13/0273; F02M 25/0752; F02M 25/0707; F02M 25/0709; F02M 25/0727; Y02T 10/18; Y02T 10/123; Y02T 10/44; F02B 1/12; F02B 2275/14
See application file for complete search history.

(56) References Cited

U.S. PATENT DOCUMENTS 5,979,398 A   11/1999  Yanagihara
6,158,413 A   12/2000  Kimura et al.
(Continued)

FOREIGN PATENT DOCUMENTS

CN       1982676 A     6/2007
JP    2000-274286 A   10/2000
(Continued)

OTHER PUBLICATIONS

The first Office Action issued by the Chinese Patent Office on Dec. 5, 2014, which corresponds to Chinese Patent Application No. 201180023310.X and is related to U.S. Appl. No. 13/696,776; with English language summary.
(Continued)

*Primary Examiner* — Hieu T Vo
*Assistant Examiner* — Sherman Manley
(74) *Attorney, Agent, or Firm* — Studebaker & Brackett PC

(57) ABSTRACT

A geometric compression ratio in an engine main body 1 is set to 15 or less. Injection control means (ECU 40) performs a main injection of injecting fuel near a compression top dead center, and a preceding injection prior to the main injection at a specific region of predetermined load within an operating region on a relatively low-speed side. The injection control means performs, as the preceding injection, a pilot injection of performing injection at a timing such that at least part of a fuel spray reaches outside a cavity 31 on a top face of a piston, and a pre-injection of injecting fuel at a predetermined timing after the pilot injection, to suppress thereby ignition of the fuel injected by the pilot injection and shorten an ignition delay of the fuel injected by the main injection.

6 Claims, 5 Drawing Sheets

(51) Int. Cl.
*F02D 41/04* (2006.01)
*F02M 25/07* (2006.01)
*F02D 41/30* (2006.01)
*F02B 1/12* (2006.01)

(52) U.S. Cl.
CPC ............ *F02D13/0273* (2013.01); *F02D 41/04* (2013.01); *F02D 41/3035* (2013.01); *F02D 41/402* (2013.01); *F02M 25/0707* (2013.01); *F02M 25/0709* (2013.01); *F02M 25/0752* (2013.01); *F02B 1/12* (2013.01); *F02B 2275/14* (2013.01); *F02M 25/0727* (2013.01); *Y02T 10/123* (2013.01); *Y02T 10/18* (2013.01); *Y02T 10/44* (2013.01)

(56) References Cited

U.S. PATENT DOCUMENTS

| | | | |
|---|---|---|---|
| 6,332,447 B1 | 12/2001 | Kimura et al. | |
| 6,725,829 B2* | 4/2004 | Kataoka | F02B 47/08 123/299 |
| 6,964,256 B2* | 11/2005 | Kataoka | F02B 1/12 123/295 |
| 7,007,463 B2 | 3/2006 | Shirakawa | |
| 7,677,222 B2* | 3/2010 | Ishikawa | F02B 15/00 123/299 |
| 8,770,174 B2* | 7/2014 | Sangkyu | F02D 41/0057 123/435 |
| 2003/0070650 A1 | 4/2003 | Ishikawa et al. | |
| 2003/0150420 A1 | 8/2003 | Ishikawa et al. | |
| 2005/0022512 A1 | 2/2005 | Shirakawa | |
| 2007/0131203 A1* | 6/2007 | Ohga | F02D 41/402 123/478 |
| 2009/0151697 A1* | 6/2009 | Hatano | F02D 35/023 123/435 |
| 2010/0312454 A1 | 12/2010 | Nada et al. | |
| 2011/0005491 A1* | 1/2011 | Terada | F02D 35/026 123/299 |
| 2012/0000197 A1* | 1/2012 | Maruyama | F02D 41/0057 60/605.2 |
| 2014/0109873 A1* | 4/2014 | Allezy | F02D 41/0047 123/435 |

FOREIGN PATENT DOCUMENTS

| | | |
|---|---|---|
| JP | 2000-352326 A | 12/2000 |
| JP | 2001-227393 A | 8/2001 |
| JP | 2002-054489 A | 2/2002 |
| JP | 2003-148222 A | 5/2003 |
| JP | 2005-048742 A | 2/2005 |
| JP | 2007-263123 A | 10/2007 |
| JP | 2007-315230 A | 12/2007 |
| JP | 2008-038600 A | 2/2008 |
| JP | 2009-121306 A | 6/2009 |
| JP | 2009-138657 A | 6/2009 |
| JP | 2009-293383 A | 12/2009 |
| WO | 2007/136142 A1 | 11/2007 |
| WO | 2009/087715 A1 | 7/2009 |
| WO | 2010/041308 A1 | 4/2010 |

OTHER PUBLICATIONS

International Search Report; PCT/JP2011/002571; Aug. 16, 2011.

* cited by examiner

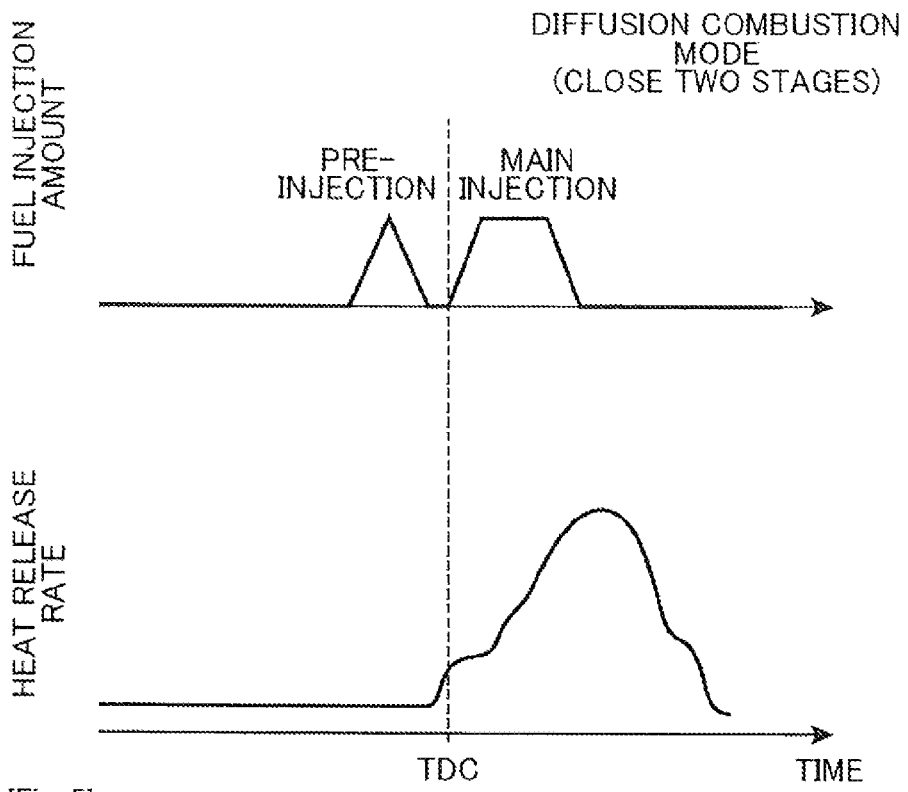
Fig. 4
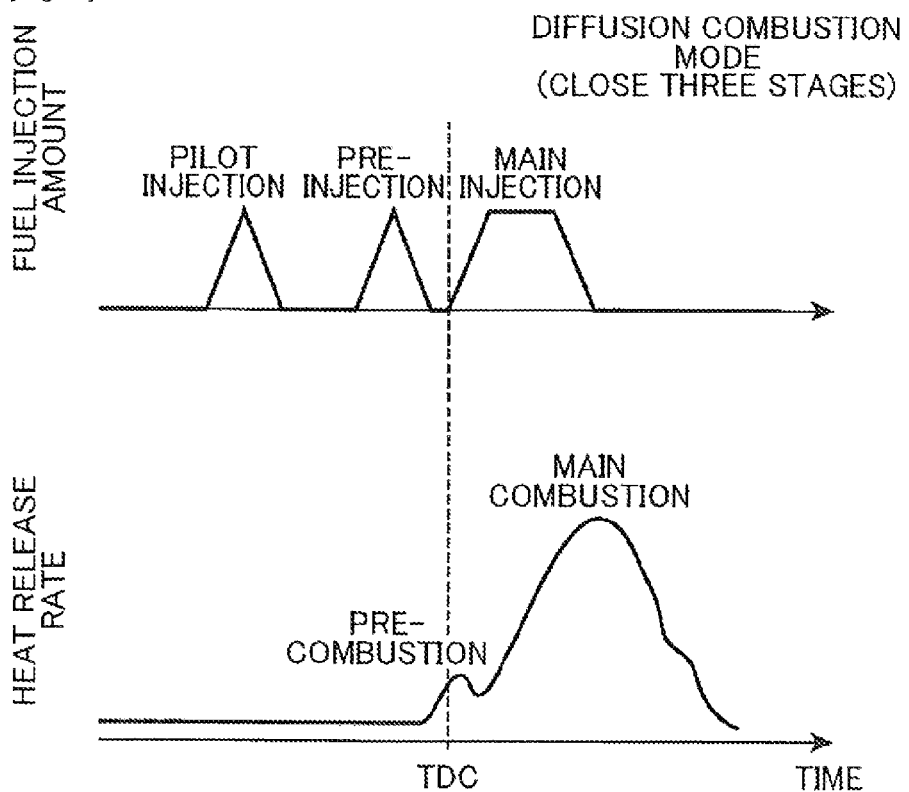
[Fig. 5]

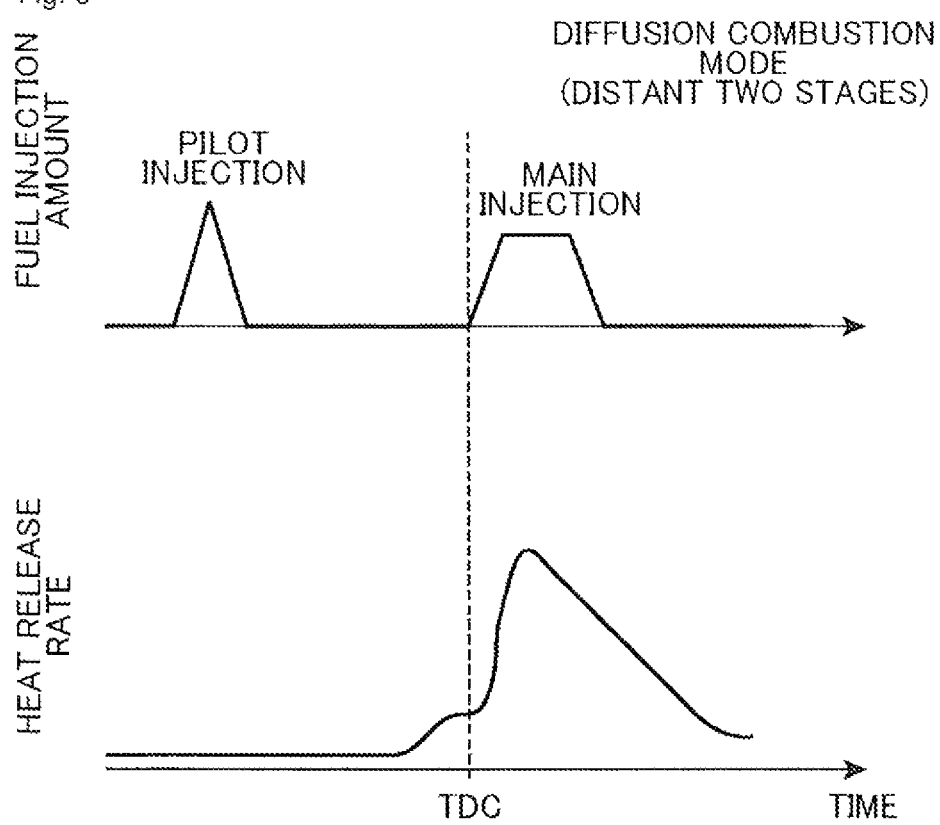

DIESEL ENGINE FOR AUTOMOBILE, CONTROL DEVICE AND CONTROL METHOD

TECHNICAL FIELD

The present invention relates to a diesel engine for automobiles, and more particularly to a diesel engine having a comparatively low compression ratio where the geometric compression ratio is set to 15 or less.

BACKGROUND ART

In diesel engines installed in automobiles, a plurality of fuel injections are carried out in each cylinder during one engine cycle, with a view to, for instance, reducing the amount of NOx and soot in the exhaust gas, lowering noise and vibration, and improving fuel consumption and torque. For instance, Japanese Patent Application Publication No. 2009-293383 (hereafter, Patent document 1) discloses a fuel injection mode in which two injections, namely a pre-injection for premixing and a pre-injection for pre-heating, are performed ahead of a main injection for torque generation.

Concerning the setting of injection timing in pre-injection for premixing and pre-injection for pre-heating, Patent document 1 also discloses the features of determining the timing at which a heat release amount or a heat release rate drops in a cylinder while varying the injection timing of pre-injection for pre-heating towards the advance side, in a state where the injection timing of the main injection is fixed, to acquire thereby an advance angle limit of pre-injection for pre-heating; and determining similarly the timing at which the amount of heat released in the cylinder becomes zero while varying the injection timing of pre-injection for premixing, in a state where the injection timing of the main injection is fixed, to acquire thereby the lag angle limit of pre-injection for pre-mixing.

In diesel engines installed in automobiles, NVH (Noise Vibration Harshness) performance is an important consideration at a region of high frequency of use and of partial load on a relatively low-speed side (low load to medium load). In particular in the medium load region within the above operating region, the heat release rate (or heat release speed dQ/dθ) increases abruptly accompanying an increase in the fuel injection amount during main combustion at which the fuel injected by the main injection burns (combustion where diffusion combustion is predominant). This is likely to give rise to an increase in combustion noise and loss of NVH performance, all of which is problematic.

As a countermeasure, the technology disclosed in the abovementioned Patent document involves only setting the lag angle limit of pre-injection for premixing and the advance angle limit of pre-injection for pre-heating, and fails to suppress abrupt increases in the heat release rate during the main combustion. Therefore, there is a need for technologies that allow actively controlling the combustion mode in the cylinders so as to suppress abrupt increases in the heat release rate during the main combustion in a predetermined load region.

CITATION LIST

Patent Literature

[PTL 1]
Japanese Patent Application Publication No. 2009-293383

SUMMARY OF INVENTION

In the light of the above, it is an object of the technology disclosed herein to improve NVH performance by controlling a combustion mode in a diesel engine for automobiles, in particular at a specific region of a predetermined load within an operating region on a relatively low-speed side.

The technology relating to the invention of the present application is a technology that focuses, in a broad sense, on increasing the controllability of a combustion mode in a cylinder, through control of a fuel injection mode, in a diesel engines having a comparatively low compression ratio where the geometric compression ratio is 15 or less, and being an engine of relatively difficult ignition conditions. Specifically, it is an object of the present invention to avoid an abrupt increase in heat release rate, and accordingly to improve NVH performance, by slowing down a combustion mode, in particular by slowing down a main combustion that accompanies a main injection, through setting of appropriate injection timings of a pilot injection and a pre-injection that precede a main injection that is performed near a compression top dead center.

In order to attain the above object, the invention of the present application is a diesel engine for automobiles, comprising: an engine main body which is installed in an automobile, to which fuel having diesel oil as a main component is supplied, and in which a geometric compression ratio according to reciprocation between a top dead center and a bottom dead center of a piston that is insertion-fitted in a cylinder is set to 15 or less; a fuel injection valve which is disposed facing into the cylinder and directly injects the fuel into the cylinder; and an injection control part for controlling an injection mode of the fuel into the cylinder by the fuel injection valve, wherein the injection control part performs, at a specific region of predetermined load within an operating region on a relatively low-speed side at a time where the engine main body is warm:

a main injection of injecting fuel near a compression top dead center; and a preceding injection of injecting fuel in a compression stroke prior to the main injection, and the injection control part performs as the preceding injection:

a pilot injection of injecting fuel at a timing such that at least part of a fuel spray reaches outside a cavity sunk in a top face of the piston; and a pre-injection of injecting fuel at a predetermined timing after the pilot injection, to suppress thereby ignition of the fuel injected by the pilot injection and shorten an ignition delay of the fuel injected by the main injection.

In the above configuration of the diesel engine for automobiles being an engine having a comparatively low compression ratio where the geometric compression ratio is 15 or less, there is performed a main injection of injecting fuel near a compression top dead center at a specific region of predetermined load within an operating region on a relatively low-speed side, at a time where the engine main body is warm, and there are performed two fuel injections, namely a pilot injection and a pre-injection, at predetermined timings in the compression stroke prior to the main injection. As a result, there is shortened a pre-combustion period immediately before the main combustion, the heat release rate at that period is made comparatively higher, and it becomes also possible slow down the main combustion through shortening of the ignition delay by the main injection. As a result, combustion noise is reduced, and NVH performance is accordingly improved.

BRIEF DESCRIPTION OF DRAWINGS

FIG. 4 is a diagram illustrating an example of a fuel injection mode in a diffusion combustion mode (close two stages), and an example of a history of heat release rate associated therewith;

FIG. 5 is a diagram illustrating an example of a fuel injection mode in a diffusion combustion mode (three stages), and an example of a history of heat release rate associated therewith;

FIG. 6 is a diagram illustrating an example of a fuel injection mode in a diffusion combustion mode (distant two stages), and an example of a history of heat release rate associated therewith.

DESCRIPTION OF EMBODIMENTS

Figure 1:
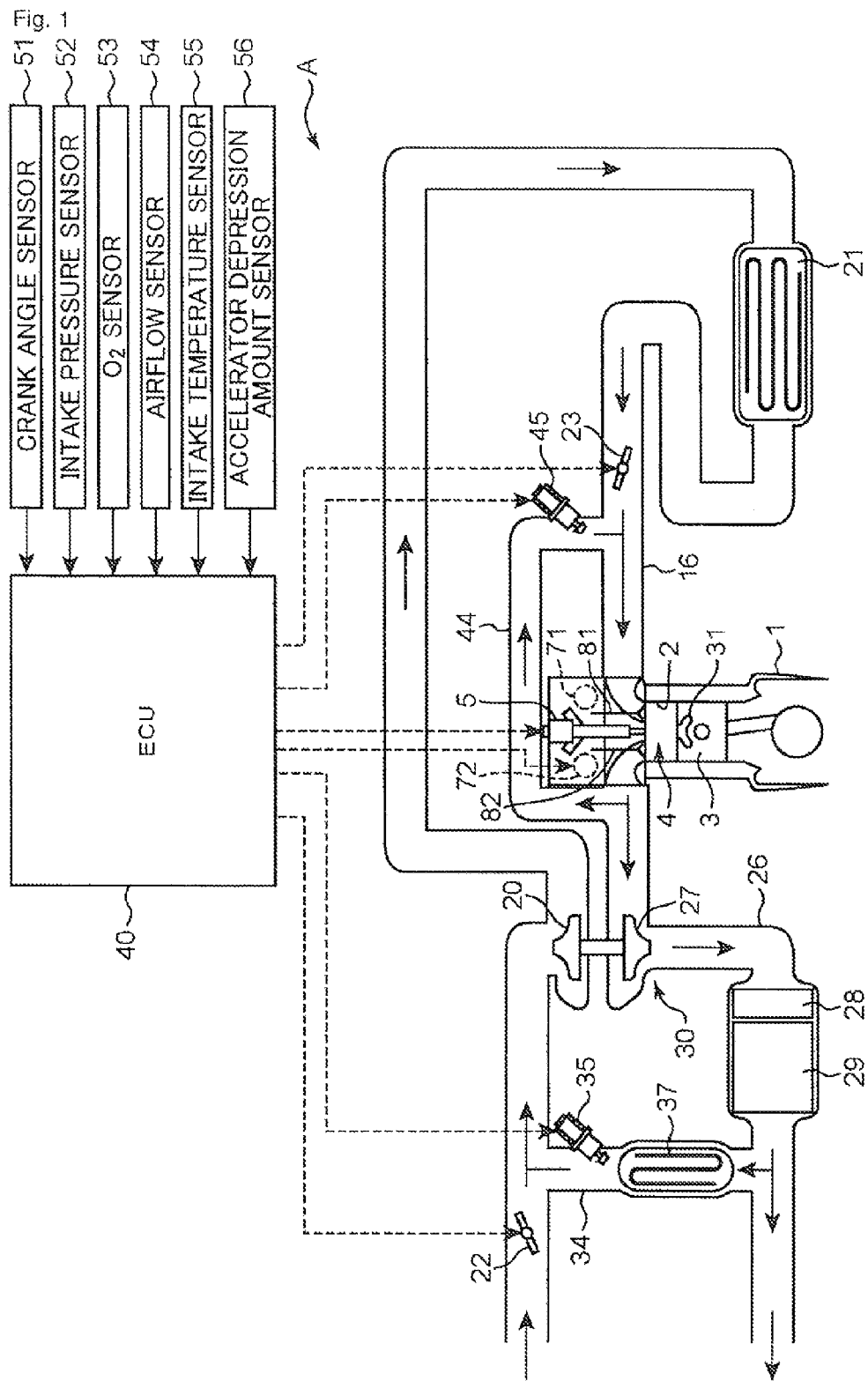
FIG. 1 is a schematic diagram illustrating the configuration of a diesel engine.

A diesel engine according to an embodiment is explained below with reference to accompanying drawings. Essentially, the preferred embodiments described below are merely illustrative in nature. FIG. 1 illustrates an example of an engine A, wherein the reference numeral 1 denotes an engine main body installed in a vehicle. The engine main body 1 is a diesel engine to which fuel having diesel oil as a main component is supplied, and has a plurality of cylinders 2, 2, . . . (only one cylinder is illustrated in the figure). A piston 3 is reciprocatingly insertion-fitted in each cylinder 2. On the top face of this piston 3 there is formed a cavity 31 that demarcates a reentrant-type combustion chamber 4.

On the ceiling portion of the combustion chamber 4 there is disposed an injector 5 (fuel injection valve), such that high-pressure fuel is directly injected into the combustion chamber 4 from an injection nozzle at the leading end portion of the injector 5. The engine main body 1 is configured as a comparatively low compression ratio engine having a geometric compression ratio of 15 or less (but not smaller than 12). As described below, a significant amount of EGR gas is led into the cylinder 2 through control of the opening and closing of an exhaust valve 82 and through control of EGR valves 35, 45 in EGR passages 34, 44, to enable thereby premixed ignition combustion (PCI (Premixed Charge Compression Ignition) combustion).

Although not shown in the figures, the configuration whereby fuel is supplied to each injector 5 of each cylinder 2 is a so-called common rail provided with a common fuel distribution pipe (common rail) to which each injector 5 is connected. As a result, fuel can be injected a plurality of times into the cylinder 2 during one cycle of the engine. As a non-limitative example, the injector 5 may be of a type having a built-in control valve, such that fuel is injected through changes in the lift of the control valve in accordance with the energization current in the injector 5.

Valve trains 71, 72 that respectively open and close the intake valve 81 and the exhaust valve 82 are disposed at the top of the engine main body 1. A hydraulically-actuated variable mechanism (hereafter, VVM (Variable Valve Motion) denoted by the reference numeral 72) that switches the operation mode of the exhaust valve 82 between an ordinary mode and a special mode is provided as a valve train 72 of the exhaust valve 82, from among the valve trains 71, 72 of the intake valve 81 and of the exhaust valve 82.

Although a detailed configuration of the VVM 72 is not shown in the figures, the VVM 72 comprises two kinds of cam having dissimilar cam profiles, namely a first cam having one cam nose, a second cam having two cam noses, and a lost motion mechanism that selectively transmits the operation state of either the first or the second cam to the exhaust valve, such that when the operation state of the first cam is being transmitted to the exhaust valve 82, the exhaust valve 82 operates in an ordinary mode in which the valve opens only once during the exhaust stroke; and when the operation state of the second cam is being transmitted to the exhaust valve 82, the valve operates in a special mode in which there is carried out so-called exhaust double-opening where the valve opens during the exhaust stroke and opens during the intake stroke.

Switching between the ordinary mode and the special mode in the VVM 72 is performed on the basis of an engine-driven hydraulic pump (not shown). As described below, the special mode can be used during control according to internal EGR. Any configuration can be resorted to, so long as an internal EGR gas can be introduced through control of the intake/exhaust valves 81, 82. For instance, there can be used an electromagnetic driven-type valve system in which the intake/exhaust valves 81, 82 are driven by an electromagnetic actuator.

An intake passage 16, for supplying air (new air) filtered through an air cleaner (not shown) to the combustion chamber 4 of each cylinder 2, is connected to one side face of the engine main body 1 (right side in the figure). In the intake passage 16 there are provided, sequentially from the upstream to the downstream side, an intake throttling valve 22 that comprises a butterfly valve, a compressor 20 that compresses the intake air by being driven by a below-described turbine 27, a intercooler 21 that cools the intake air compressed by the compressor 20, and a intercooler (I/C) channel throttling valve 23 that comprises a butterfly valve.

On the opposite side face of the engine main body 1 (left side in the figure) there is connected an exhaust passage 26 for exhaust of combustion gas (exhaust gas) from the respective combustion chamber 4 of each cylinder 2.

The upstream end of the exhaust passage 26 is an exhaust manifold that branches for each cylinder 2 and that communicates with a respective combustion chamber 4 by way of an exhaust port. A turbine 27 that rotates upon receiving the exhaust flow, and a diesel oxidation catalyst 28 and DPF (diesel particulate filter) 29 capable of purifying noxious components in the exhaust, are disposed in this order, from the upstream side to the downstream side, at the exhaust passage 26, downstream of the exhaust manifold. The oxidation catalyst 28 and the DPF 29 are housed in one case.

The oxidation catalyst 28 has an oxidation catalyst that supports a catalyst of platinum or platinum having palladium added thereto. The oxidation catalyst 28 accelerates the reactions of oxidation of CO and HC in exhaust gas, as a result of which $CO_2$ and $H_2O$ are generated. The DPF 29 captures microparticles such as soot or the like that are present in the exhaust gas of the engine main body 1. The DPF 29 may be coated with an oxidation catalyst.

The upstream end of a first exhaust recirculation passage (hereafter, first EGR passage) 34, for recirculation of part of the exhaust towards the intake side, is connected to the exhaust passage 26, in such a manner that the first EGR passage 34 is opened facing a site further on the exhaust downstream side than the DPF 29.

The downstream end of the first EGR passage 34 is connected to the intake passage 16 between the intake throttling valve 22 and the compressor 20, whereby part of the exhaust taken out of the exhaust passage 26 is recirculated to the intake passage 16. Halfway along the first EGR passage 34 there are disposed an EGR cooler 37 for cooling the exhaust that flows through the interior of the first EGR passage 34, and an exhaust recirculation amount regulation valve (hereafter first EGR valve) 35 the degree of opening whereof can be regulated.

The upstream end of a second exhaust recirculation passage (hereafter, second EGR passage) 44 is connected to the exhaust manifold. The downstream end of the second EGR passage 44 is connected to the intake passage 16 downstream of the intercooler 21 (I/C channel throttling valve 23). A second exhaust recirculation amount regulation valve (hereafter, second EGR valve) 45 the degree of opening whereof can be regulated, is disposed halfway the second EGR passage 44. The EGR cooler may be interposed halfway along the second EGR passage 44.

The injector 5, as well as the VVM 72, intake throttling valve 22, I/C channel throttling valve 23, first and second EGR valves 35, 45 and so forth in the driven valve system are driven upon reception of control signals from a control unit (Electronic Control Unit, hereafter ECU) 40.

The ECU 40 is made up of a microprocessor having a CPU, a memory, a counter timer group, an interface, and a path that connects the foregoing units. The ECU 40 has inputted thereto output signals from, for instance, at least a crank angle sensor 51 that detects the rotation angle of a crankshaft of the engine main body 1, an intake pressure sensor 52 that detects the intake pressure state, an $O_2$ sensor 53 that detects the oxygen concentration in the exhaust, an airflow sensor 54 that detects the flow rate of external air suctioned into the engine main body 1, an intake temperature sensor 55 that detects the intake temperature after EGR gas mixing, and an accelerator depression amount sensor 56 that detects the degree of depression (accelerator depression amount) of an accelerator pedal not shown.

The state of the engine main body 1 and of the vehicle is assessed by carrying out various computations on the basis of the foregoing signals. Control signals are outputted to the injector 5, the VVM 72 and the various valves 22, 23, 35, 45 of the driven valve system, in accordance with the state thus determined. The ECU 40 constitutes an injection control part and EGR amount control part.

(Overview of Combustion Control in the Engine)

Basic control of the engine main body 1 by the ECU 40 involves deciding a target torque (target load) on the basis mainly of the accelerator depression amount, and controlling, for instance, the amount of fuel injection and injection periods according to the target torque, through control of the operation of the injector 5. The recirculation proportion of exhaust into the cylinder 2 is controlled through control of the degree of opening of the throttling valves 22, 23, the first and second EGR valves 35, 45 (external EGR control), and the VVM 72 (internal EGR control).

Figure 2:
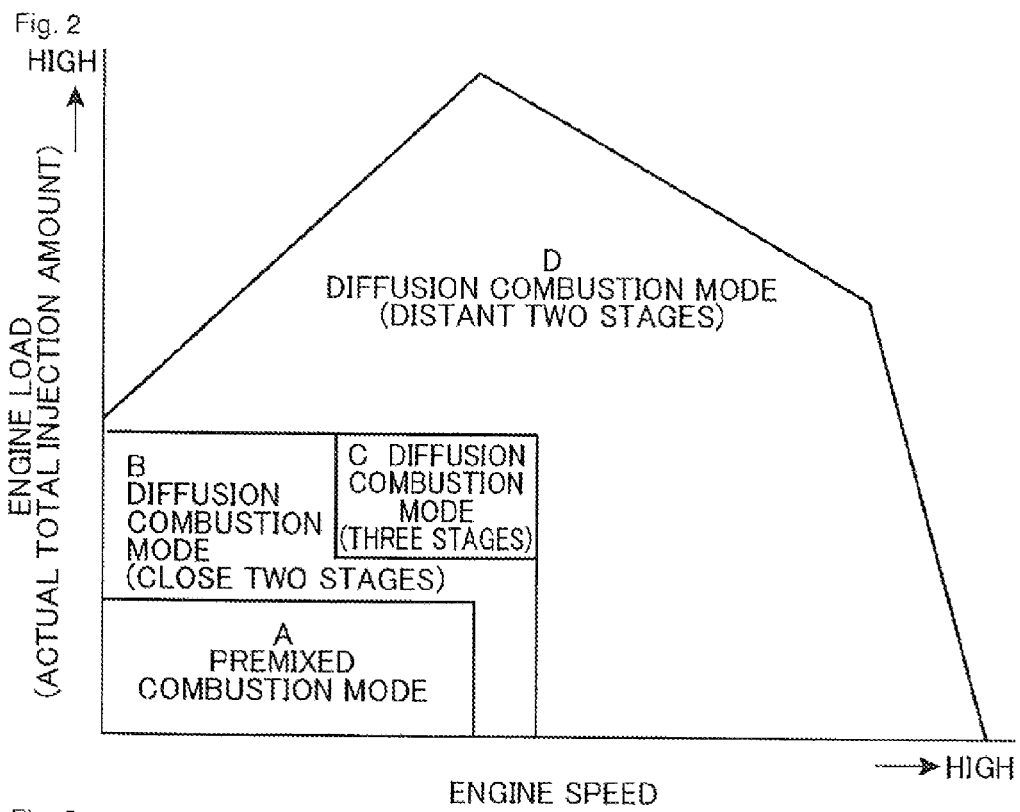
FIG. 2 is an example of a map of a fuel injection mode of an injector according to the state of a diesel engine.

FIG. 2 is a map illustrating the fuel injection modes of the injector 5, according to the state of the engine, when the engine main body 1 is warm. When warm, the engine main body 1 switches roughly between two combustion modes, as illustrated in FIG. 2, namely a premixed combustion mode (region A in the figure) and a diffusion combustion mode (regions B, C and D in the figure), according to engine speed and engine load (actual total injection amount of fuel).

In the diffusion combustion mode, basically, fuel is injected into the cylinder 2 when the piston 3 is near the compression top dead center (main injection). As a result, fuel injection by the injector 5 and fuel ignition take place in parallel. In the diffusion combustion mode in this embodiment, a preceding injection is carried out before a main injection.

In the premixed combustion mode, fuel is injected into the cylinder 2 at an early timing in the compression stroke, and fuel injection is terminated before fuel ignition. As a result, the fuel can yield a homogeneous atmosphere before fuel ignition, and hence incomplete fuel combustion and formation of soot are suppressed through a comparatively lower equivalence ratio between fuel and air. The premixed combustion mode is advantageous in terms of fuel consumption and emissions, but requires securing some time for homogenizing the fuel. Accordingly, the premixed combustion mode is used when the engine load is comparatively low and engine speed are likewise comparatively low.

In the present embodiment, the diffusion combustion mode is divided into three regions in accordance with engine load and engine speed. The fuel injection mode is different in the respective regions.

Specifically, at a region of comparatively high load and relatively low-speed (region of the left of the map of FIG. 2), fuel injection is set to be performed three times in the form of a pilot injection, a pre-injection and a main injection (diffusion combustion mode (3 stages) in region C). At a region on the low-speed side excluding the three-stage diffusion combustion mode region C and the premixed combustion mode region A, fuel injection is set to be performed two times, in the form of a pre-injection and main injection (diffusion combustion mode in region B (close two stages)). Hereinafter, low engine speed corresponds to a speed range from 0 to 1500 RPM, and high engine speed corresponds to a speed range from 3000 to 4500 RPM, unless otherwise specifically stated.

In a region on the side at which engine speeds are relatively high (region on the right of the map of FIG. 2) or a region of higher load than the abovementioned regions B and C of the diffusion combustion mode, fuel injection is set to be performed two times in the form of a pilot injection and a main injection (diffusion combustion mode in region D (distant two stages)).

In regions A, B, C of relatively low load, in particular, control by the VVM 72 causes a comparatively large amount of internal EGR gas to be introduced into the cylinder 2, whereby exhaust emission is improved. Fuel ignitability may become impaired in the cylinder 2, at these operating regions, as the large amount of internal EGR gas that is introduced is compounded with the fact that, as described above, there is a low compression ratio in the engine main body 1.

The fuel injection modes according to each combustion mode are explained below with reference to FIGS. 3 to 6. The fuel injection amount and heat release rate illustrated in FIGS. 3 to 6 do not necessarily indicate the relative magnitudes of fuel injection amount and heat release rate in comparisons between the figures.

Figure 3:
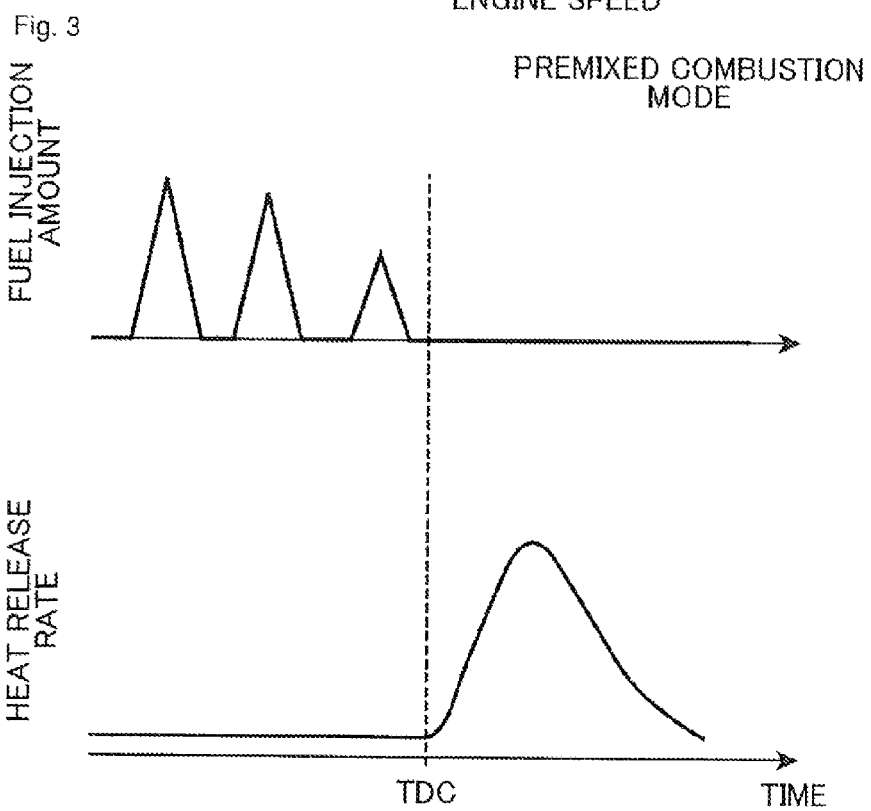
FIG. 3 is a diagram illustrating an example of a fuel injection mode in a premixed combustion mode, and an example of a history of heat release rate associated therewith.

Firstly, FIG. 3 illustrates an example of a fuel injection mode (top of the figure) in the premixed combustion mode region A, and the resulting history of the heat release rate in the cylinder 2 (bottom of the figure). In the premixed combustion mode region A, as described above, there are performed three fuel injections, spaced apart from each other by predetermined time intervals, in a compression stroke (before the compression top dead center), such that the fuel injection amount that is injected at a relatively early timing is relatively large, and the fuel injection amount that is injected at a relatively late timing is relatively small.

This is done to increase the premixing ability of fuel, through early injection of as much fuel as possible. The number of fuel injections in the premixed combustion mode region A is not limited to three, and may be set arbitrarily. The fuel thus injected burns through auto-ignition near the compression top dead center, in a state where fuel is thoroughly mixed with air (PCI combustion). Such a premixed combustion mode is advantageous in terms of fuel consumption and exhaust emissions at a region of low engine load and low engine speed.

FIG. 4 illustrates an example of a fuel injection mode at a close two-stage diffusion combustion mode region B (top of the figure) and a resulting history of heat release rate in the cylinder 2 (bottom of the figure). As described above, two fuel injections are carried out at region B, namely a main injection near the compression top dead center, and a pre-injection immediately before the main injection. Herein, the injection timing intervals of the main injection and the pre-injection (preceding injection) are relatively close to each other, and hence the diffusion combustion mode at region B is called a close two-stage diffusion combustion mode.

The pre-injection is an injection for reducing combustion noise by suppressing an abrupt increase in the heat release rate during the main combustion that accompanies the main injection. By taking place immediately before the compression top dead center, substantially the entirety of the fuel spray of the pre-injection reaches into the cavity 31 at the top face of the piston 3. The temperature in the cylinder 2 rises as a result of the start of pre-combustion that accompanies pre-injection, and there is shortened the ignition delay to the time at which main injection is carried out. This shortening of the ignition delay of the main injection slows down the main combustion, and contributes thereby to suppressing an abrupt increase in the heat release rate. Combustion noise can be reduced as a result.

FIG. 5 illustrates an example of a fuel injection mode at a three-stage diffusion combustion mode region C (top of the figure) and a resulting history of heat release rate in the cylinder 2 (bottom of the figure). Three fuel injections are carried out in region C, as described above, namely a main injection near the compression top dead center, a pre-injection immediately before the main injection, and a pilot injection separated by an interval from the pre-injection timing, in the latter half of the compression stroke.

The pilot injection increases the fuel premixing ability by being carried out at the latter half of the compression stroke, removed from the TDC. Also, at least part of the injected fuel spray reaches outside the cavity 31 of the piston 3, whereby the fuel spray can become mixed with air in the cylinder outside the cavity 31. Air utilization is enhanced as a result.

Also, pre-injection is carried out at a timing such that substantially all the fuel spray reaches into the cavity 31, as described above. That timing can overlap with the timing at which the fuel injected by the pilot injection auto-ignites through compression in the cylinder 2.

In performing pre-injection, auto-ignition of the premixed gas at this timing is suppressed through lowering of the temperature of the premixed gas in the cylinder 2 on account of the latent heat of vaporization of the fuel injected by pre-injection, and/or through strengthening of the flow of in the cylinder 2 that accompanies fuel injection. That is, pre-injection allows lengthening the ignition delay of pilot injection.

Thus, fuel injected by the pre-injection and fuel injected by the pilot injection undergo pre-combustion immediately before the main combustion that accompanies the main injection. However, the pre-combustion is carried out in such a manner that fuel premixing by pilot injection advances sufficiently, as described above, and the fuel injected by the pre-injection is added to the atmosphere having the advanced-premixed fuel therein. As a result, the combustion period can be made comparatively shorter, and the heat release rate comparatively higher.

The interior of the cylinder 2 is brought to a readily ignitable state through shortening of the combustion period of pre-combustion immediately before the main combustion and through increase of the heat release rate. Ignition delay of fuel injected through execution of the main injection is shortened as a result. This allows slowing down the main combustion and avoiding abrupt increases in the heat release rate, which is advantageous in terms of reducing combustion noise.

From the viewpoint of shortening the ignition delay of fuel by the main injection, the heat release rate in the pre-combustion is preferably set to be comparatively high. However, an excessively high heat release rate in pre-combustion may give rise to the problem of combustion noise during pre-combustion. Therefore, the heat release rate is preferably limited so as to be no greater than a predetermined heat release rate. Accordingly, the fuel injection amounts and injection timings of pilot injection and pre-injection are preferably set so as to achieve a high heat release rate within a range that satisfies a limited heat release rate.

A comparison between the diffusion combustion mode in region B and the diffusion combustion mode in region C shows that in region B pre-injection alone is carried out as the preceding injection before the main injection, whereas in region C both pilot injection and pre-injection are carried out as preceding injections before the main injection.

That is because region C is a region of relatively high load, and also a region at which combustion noise is likely to be substantial through increased fuel injection amount in the main injection, whereas, by contrast, region B is a region of relatively low load and at which the fuel injection amount in the main injection is relatively small, so that combustion noise is not that substantial.

Also, region C is a region of high frequency of use of the engine main body 1, and in particular a region at which NVH performance is likely to be problematic. Therefore, combustion noise is reliably reduced at region C. Abrupt increases in the heat release rate during the main combustion is suppressed, in region B, by simply performing both pilot injection and pre-injection at region C but only pre-injection at region B. Thereby, combustion noise can be reduced to a non-problematic level. Fuel consumption performance can be enhanced as a result by omitting the pilot injection.

FIG. 6 illustrates an example of a fuel injection mode at a diffusion combustion mode region D (top of the figure) and a resulting history of heat release rate in the cylinder (bottom of the figure). As described above, two fuel injections are carried out in the diffusion combustion mode region D, namely a pilot injection and a main injection near the compression top dead center.

Herein, the injection timing intervals of the main injection and the pilot injection (preceding injection) are relatively distant from to each other, and hence the diffusion combustion mode at region D is called a distant two-stage diffusion combustion mode.

A comparison between the diffusion combustion mode in region D and the diffusion combustion mode in region C shows that at region D pilot injection alone is carried out as the preceding injection before the main injection, whereas both pilot injection and pre-injection are carried out in region C, as described above.

That is because a relatively high torque is required at region D, and hence torque performance takes precedence over NVH performance. At region D, specifically, part of the fuel spray is brought into the cavity 31 of the piston 3 on account of the pilot injection, as a result of which air utilization is enhanced and premixing ability increased. This is advantageous for increasing torque in this operating region where the fuel injection amount is relatively greater.

The effect of reducing combustion noise at the three-stage diffusion combustion mode region C will be explained next with reference to FIG. 7.

Figure 7:
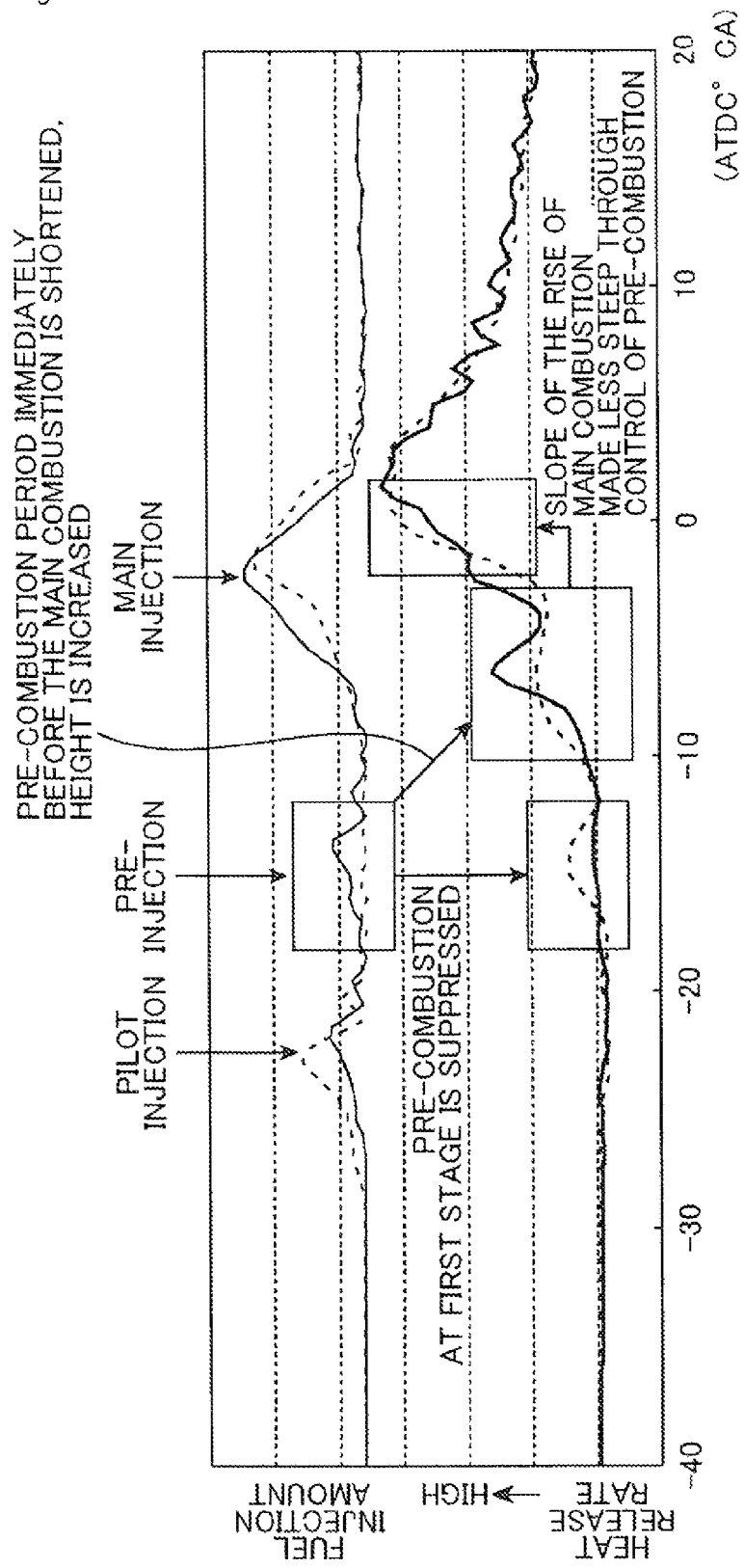
FIG. 7 is a diagram illustrating a working example (example) of a fuel injection mode and a history of heat release rate in a diffusion combustion mode (three stages), and illustrating a working example (comparative example) of a fuel injection mode and a history of heat release rate in a case where no pre-injection is carried out.

FIG. 7 is a diagram of a comparison between the history of the change of the heat release rate in the cylinder 2 in a case where both pilot injection and pre-injection are carried out, as a preceding injection, before the main injection (example, solid line in the figure), as in the above-described diffusion combustion mode region C, and the history of the change of the heat release rate in the cylinder 2 in a case where only pilot injection, but no pre-injection, is carried out as a preceding injection (comparative example, broken line in the figure). The top graph in FIG. 7 denotes the history of the change of the fuel injection amount, which can be represented, for instance, by the lift of the control valve in the injector.

The geometric compression ratio is set to 14 and the EGR rate to 40%. The EGR rate is defined herein as (concentration (%) of $CO_2$ in the intake passage-concentration (%) of $CO_2$ in the atmosphere)/(concentration (%) of $CO_2$ in the exhaust-concentration (%) of $CO_2$ in the atmosphere).

When pilot injection is carried out but pre-injection is not, the fuel injected by the pilot injection auto-ignites, and pre-combustion starts, at a point in time fairly earlier than the main injection, as indicated by the broken line in the figure. Pre-combustion before the main combustion exhibits thereby a longer combustion period and a lower heat release rate. As a result, the heat release rate in the main combustion exhibits an abrupt increase, and combustion noise worsens. This can be attributed to the longer ignition delay of the fuel by the main injection.

By contrast, auto-ignition is suppressed by performing pilot injection and by performing pre-injection at a timing such that the fuel injected by the pilot injection can auto-ignite. Ignition delay is extended thus up to a timing immediately before the main combustion.

Consequently, the fuel of advanced premixing by the pilot injection and the fuel added by pre-injection burn during the pre-combustion immediately before the main combustion. As a result, the combustion period is shortened and the heat release rate becomes comparatively higher.

In the heat release rate history of the present example, the peak of pre-combustion rises and drops then temporarily, after which there rises the peak of the main combustion. Abrupt increases in the heat release rate are suppressed (the slope of the solid line in FIG. 7 is less steep than the slope of the broken line), and combustion noise is reduced thereby. This can be attributed to the shorter ignition delay of fuel by the main injection, and the slower main combustion, that are brought about as a result of a shorter combustion period and a higher heat release rate in the pre-combustion.

Specifically, the timing of the main injection is set in such a manner that the timing of the peak of heat release rate by the main combustion is substantially the MBT, in other words, in such a manner that the summits of the peaks of heat release rate by the main combustion coincide, for both the comparative example and the example. Shortening the ignition delay of fuel by the main injection contributes to making the main combustion peak start rising early and with a gentle slope.

Thus, both pilot injection and pre-injection, as preceding injections before the main injection, are carried out at an appropriate timing at a partial load region in a relatively low-speed region (region C), assuming difficult combustion conditions in the cylinder 2 in the diesel engine A on account of the geometric compression ratio being a comparatively low compression ratio, of 15 or less, and on account of the large amount of EGR gas being introduced. As a result, ignition delay of fuel injected by the main injection is shortened, and abrupt increases in the heat release rate by the main combustion are suppressed thereby.

Combustion noise is reduced as a result. Region C, in particular, is a regular-use region having a high so-called frequency of use. Therefore, reducing combustion noise is advantageous for enhancing the NVH performance of the engine main body 1.

Also, forbidding pilot injection, as the preceding injection, at region B that is adjacent to region C on the low load side, and carrying out pre-injection alone, is advantageous in terms of fuel consumption while avoiding a loss of NVH performance. Meanwhile, torque performance can be enhanced by forbidding pre-injection, as a preceding injection, and carrying out pilot injection alone, at region D where NVH is not a significant problem and which is a region adjacent to region C, on the high load side, or a region on the side of relatively high engine speed.

Performing PCI combustion at region A, which is further on the low load side than region B, is advantageous in terms of fuel consumption and emissions. In region A, the main injection may be performed near the compression top dead center for diffusion combustion. In this case, the fuel injection proportion of the preceding injection in the compression stroke is preferably set to be relatively high.

Overview of the Invention of the Present Application:

The technology relating to the invention of the present application focuses, in a broad sense, on increasing the controllability of a combustion mode in a cylinder through control of a fuel injection mode, in diesel engines having a comparatively low compression ratio where the geometric compression ratio is 15 or less, being engines of relatively difficult ignition conditions. Therefore, it is an object of the present invention to avoid an abrupt increases in heat release rate, and accordingly to improve NVH performance, by slowing down a combustion mode, in particular by slowing down a main combustion that accompanies a main injection, through setting of appropriate injection timings of a pilot injection and a pre-injection that precede a main injection that is performed near a compression top dead center.

In order to attain the above object, the invention of the present application is a diesel engine for automobiles, comprising: an engine main body which is installed in an automobile, to which fuel having diesel oil as a main component is supplied, and in which a geometric compression ratio according to reciprocation between a top dead center and a bottom dead center of a piston that is insertion-fitted in a cylinder is set to 15 or less; a fuel injection valve which is disposed facing into the cylinder and directly injects the fuel into the cylinder; and an injection control part for controlling an injection mode of the fuel into the cylinder by the fuel injection valve, wherein the injection control part performs, at a specific region of predetermined load within an operating region on a relatively low-speed side at a time where the engine main body is warm:

a main injection of injecting fuel near a compression top dead center; and a preceding injection of injecting fuel in a compression stroke prior to the main injection, and the injection control part performs as the preceding injection:

a pilot injection of injecting fuel at a timing such that at least part of a fuel spray reaches outside a cavity sunk in a top face of the piston; and a pre-injection of injecting fuel at a predetermined timing after the pilot injection, to suppress thereby ignition of the fuel injected by the pilot injection and shorten an ignition delay of the fuel injected by the main injection.

In the above configuration of the diesel engine for automobiles being an engine having a comparatively low compression ratio where the geometric compression ratio is 15 or less, there is performed a main injection of injecting fuel near a compression top dead center, and there are performed two fuel injections, namely a pilot injection and a pre-injection, at predetermined timings in the compression stroke prior to the main injection, at a specific region of predetermined load within an operating region on a relatively low-speed side, at a time where the engine main body is warm. As a result, there is shortened a pre-combustion period immediately before the main combustion, the heat release rate at that period is made comparatively higher, and it becomes also possible slow down the main combustion through shortening of the ignition delay by the main injection. As a result, combustion noise is reduced, and NVH performance is accordingly improved.

Specifically, the diesel engine disclosed herein comprises: an engine main body which is installed in an automobile, to which fuel having diesel oil as a main component is supplied, and in which a geometric compression ratio according to reciprocation between a top dead center and a bottom dead center of a piston that is insertion-fitted in a cylinder is set to 15 or less; a fuel injection valve which is disposed facing into the cylinder and directly injects the fuel into the cylinder; and an injection control part for controlling an injection mode of the fuel into the cylinder by the fuel injection valve.

The injection control part performs, at a specific region of predetermined load within an operating region on a relatively low-speed side at a time where the engine main body is warm: a main injection of injecting fuel near a compression top dead center; and a preceding injection of injecting fuel in a compression stroke prior to the main injection, and the injection control part performs as the preceding injection: a pilot injection of injecting fuel at a timing such that at least part of a fuel spray reaches outside a cavity sunk in a top face of the piston; and a pre-injection of injecting fuel at a predetermined timing after the pilot injection, to suppress thereby ignition of the fuel injected by the pilot injection and shorten an ignition delay of the fuel injected by the main injection. Herein, the geometric compression ratio of the engine main body may be set, for instance, to range from 12 to 15.

In such a configuration, there is performed a main injection of injecting fuel near the compression top dead center, and a preceding injection of injecting fuel in a compression stroke prior to the main injection, within an operating region on a relatively low-speed side at a time where the engine main body is warm, and at a specific region of predetermined load, for instance a medium load region in a case where the operating region of the engine is divided into three load regions namely low, medium and high where the low load region corresponds to 0 to ⅓ WOT, the medium load region corresponds to ⅓ to ⅔ WOT, and the high load region corresponds to ⅔ to 3/3 WOT. Please note that "WOT" stands for—Wide Open Throttle—(100% opening of throttle). As the preceding injection there are carried out two fuel injections, i.e. a pilot injection and a pre-injection. The pilot injection, among the foregoing, is a fuel injection in which injection is performed at an early timing such that at least part of a fuel spray reaches outside a cavity of the piston (in other words, not all the fuel spray reaches into the cavity), and the fuel spray can become mixed with air in the cylinder outside the cavity. Both air utilization and fuel premixing ability are enhanced as a result.

By contrast, pre-injection is a fuel injection in which fuel is injected after the pilot injection but before the main injection. The pre-injection timing may be a timing at which essentially all the fuel spray has reached into the cavity. A preferred pre-injection timing overlaps with a timing such that fuel injected by the pilot injection can ignite accompanying compression in the cylinder. This suppresses ignition at this timing of fuel injected by the pilot injection through lowering of the temperature of the premixed gas on account of the latent heat of vaporization of the fuel injected by pre-injection, and/or through strengthening of the flow of in the cylinder that accompanies fuel injection. That is, pre-injection is an injection for lengthening the ignition delay of fuel injected by the pilot injection.

The fuel injected by pre-injection, burns (pre-combustion) immediately before the main combustion, together with the fuel injected by the pilot injection. In this pre-combustion, the presence of fuel of advanced premixing on account of the pilot injection is combined with the additional injection of fuel by pre-injection. Thereby, the combustion period can be made shorter, and the heat release rate comparatively higher. In pre-combustion having such characteristics, ignitability can be kept at an appropriately high state through a sufficient rise in the temperature inside the cylinder, at the timing at which main injection is performed. Therefore, ignition delay of fuel by the main injection is shortened, whereby the main combustion can be slowed down. That is, combustion noise can be reduced through suppression of abrupt increases in the heat release rate during the main combustion. The pre-injection is an injection for, in combination with the pilot injection, shortening ignition delay in the main injection.

The above-described diesel engine is a diesel engine having a comparatively low compression ratio, where the geometric compression ratio is set to 15 or less. Therefore, the combustion mode of pre-combustion can be controlled through controlling of the pilot injection and pre-injection timings. The combustion mode of the main combustion is likewise controlled, which is advantageous in terms of reducing combustion noise and improving NVH performance.

The diesel engine may further comprise EGR amount control part for adjusting an EGR gas amount in the cylinder, wherein the EGR amount control part introduces the EGR gas into the cylinder at least at the specific region.

Ignitability in the cylinder worsens through introduction of EGR gas into the cylinder at the specific region, coupled with the fact that the geometric compression ratio is 15 or less. By contrast, controllability of the combustion mode of the pre-combustion and the main combustion is enhanced through control of the pilot injection and the pre-injection. That is, the above configuration can be yet more advantageous in terms of reducing combustion noise and improving NVH performance.

The EGR amount control part may adjust an internal EGR gas amount by controlling an operation of at least one from among an intake valve and an exhaust valve in the engine main body. During the intake stroke, for instance, there is performed a so-called exhaust double-opening, in which the exhaust valve is re-opened, as a result of which a large amount of EGR gas is introduced into the cylinder, and the precision of the control of the above-described combustion mode can be further enhanced.

The injection control part may prohibit the pilot injection serving as the preceding injection and may perform the pre-injection, at a second specific region adjacent to the specific region on a low load side within the operating region on a relatively low-speed side.

At the region (second specific region) on a lower load side than the abovementioned specific region, the fuel injection amount in the main injection can be reduced on account of the relatively low load. Therefore, abrupt increases in the heat release rate during the main combustion can be suppressed beforehand. This is advantageous in terms of combustion noise, and allows attaining a desired NVH performance through pre-injection alone, even if no pilot injection is performed.

The injection control part may increase a fuel injection proportion by the preceding injection with respect to a fuel injection proportion by the main injection, at an operating region further on the low load side than the second specific region within the operating region on a relatively low-speed side. Herein, the feature "increase a fuel injection proportion by the preceding injection with respect to a fuel injection proportion by the main injection" includes an instance of performing a preceding injection alone, and no main injection (in other words, setting the fuel injection proportion of the main injection to zero).

Combustion stability is relatively lower at an operating region further on the low load side than the above-mentioned second specific region. Therefore, combustion stability is preferably increased by enhancing the premixing ability through an increase in the fuel injection proportion by the preceding injection. Also, performing a so-called premixed compression ignition combustion in the operating region, i.e. performing only a preceding injection without carrying out the main injection can be yet more advantageous from the viewpoint of fuel consumption and emissions.

The injection control part may prohibit the pre-injection serving as the preceding injection, and may perform the pilot injection, at an operating region on a higher load side than the specific region, or at an operating region on a relatively high speed side.

An operating region on a higher load side than the specific region or on a relatively high speed side is a region at which NVH performance is not likely to be problematic. Accordingly, pre-injection, which is effective for reducing combustion noise, is prohibited, and pilot injection alone is performed as the preceding injection. As described above, pilot injection increases air utilization by part of the fuel spray reaching outside the cavity. This is advantageous for increasing torque at an operating region on a high speed side or at high load, at which the fuel injection amount is relatively increased.

Another aspect of the invention of the present application relates to a control device of a diesel engine for automobiles, wherein the diesel engine includes: an engine main body which is installed in an automobile, to which fuel having diesel oil as a main component is supplied, and in which a geometric compression ratio according to reciprocation between a top dead center and a bottom dead center of a piston that is insertion-fitted in a cylinder is set to 15 or less; and a fuel injection valve which is disposed facing into the cylinder and directly injects the fuel into the cylinder, and wherein the control device comprises injection control part for controlling an injection mode of the fuel into the cylinder by the fuel injection valve, the injection control part performs, at a specific region of predetermined load within an operating region on a relatively low-speed side at a time where the engine main body is warm:

a main injection of injecting fuel near a compression top dead center; and a preceding injection of injecting fuel in a compression stroke prior to the main injection, and the injection control part performs as the preceding injection:

a pilot injection of injecting fuel at a timing such that at least part of a fuel spray reaches outside a cavity sunk in a top face of the piston; and a pre-injection of injecting fuel at a predetermined timing after the pilot injection, to suppress thereby ignition of the fuel injected by the pilot injection and shorten an ignition delay of the fuel injected by the main injection.

In the control device of the diesel engine for automobiles having the above configuration and being an engine having a comparatively low compression ratio where the geometric compression ratio is 15 or less, there is performed a main injection of injecting fuel near a compression top dead center, and there are performed two fuel injections, namely a pilot injection and a pre-injection, at predetermined timings in the compression stroke prior to the main injection, at a specific region of predetermined load within an operating region on a relatively low-speed side, at a time where the engine main body is warm. As a result, there is shortened a pre-combustion period immediately before the main combustion, the heat release rate at that period is made comparatively higher, and it becomes also possible slow down the main combustion through shortening of the ignition delay by the main injection. As a result, combustion noise is reduced, and NVH performance is accordingly improved.

The invention of the present application relates also to a method for controlling a diesel engine for automobiles, the diesel engine including: an engine main body which is installed in an automobile, to which fuel having diesel oil as a main component is supplied, and in which a geometric compression ratio according to reciprocation between a top dead center and a bottom dead center of a piston that is insertion-fitted in a cylinder is set to 15 or less; a fuel injection valve which is disposed facing into the cylinder and directly injects the fuel into the cylinder; and injection control means for controlling an injection mode of the fuel into the cylinder by the fuel injection valve, the control method comprising:

a step in which the injection control part performs, at a specific region of predetermined load within an operating region on a relatively low-speed side at a time where the engine main body is warm:

a main injection of injecting fuel near a compression top dead center; and a preceding injection of injecting fuel in a compression stroke prior to the main injection step, and a step in which the injection control part performs as the preceding injection:

a pilot injection of injecting fuel at a timing such that at least part of a fuel spray reaches outside a cavity sunk in a top face of the piston; and a pre-injection of injecting fuel at a predetermined timing after the pilot injection, to suppress thereby ignition of the fuel injected by the pilot injection and shorten an ignition delay of the fuel injected by the main injection.

In the control method of the diesel engine for automobiles having the above configuration and being an engine having a comparatively low compression ratio where the geometric compression ratio is 15 or less, there is performed a main injection of injecting fuel near a compression top dead center, and there are performed two fuel injections, namely a pilot injection and a pre-injection, at predetermined timings in the compression stroke prior to the main injection, at a specific region of predetermined load within an operating region on a relatively low-speed side, at a time where the engine main body is warm. As a result, there is shortened a pre-combustion period immediately before the main combustion, the heat release rate at that period is made comparatively higher, and it becomes also possible slow down the main combustion through shortening of the ignition delay by the main injection. As a result, combustion noise is reduced, and NVH performance is accordingly improved.

The invention claimed is:

1. A diesel engine for automobiles, comprising:
an engine main body which is installed in an automobile, to which fuel having diesel oil as a main component is supplied, and in which a geometric compression ratio according to reciprocation between a top dead center and a bottom dead center of a piston that is insertion-fitted in a cylinder is set to 15 or less;
a fuel injection valve which is disposed facing into the cylinder and directly injects the fuel into the cylinder; and
injection control part for controlling an injection mode of the fuel into the cylinder by the fuel injection valve,
wherein the injection control part performs, at a specific region of predetermined load within an operating region on a relatively low-speed side when the engine main body is warm:
a main injection of injecting fuel near a compression top dead center; and
a preceding injection of injecting fuel in a compression stroke prior to the main injection, and
the injection control part performs as the preceding injection:
a pilot injection of injecting fuel at a timing such that at least part of a fuel spray reaches outside a cavity sunk in a top face of the piston; and
a pre-injection of injecting fuel at a predetermined timing after the pilot injection, to suppress thereby ignition of the fuel injected by the pilot injection and shorten an ignition delay of the fuel injected by the main injection;
wherein the injection control part prohibits the pilot injection serving as the preceding injection and performs the pre-injection, at a second specific region adjacent to the specific region on a low load side within the operating region on a relatively low-speed side, and
wherein the injection control part
increases a fuel injection proportion by the preceding injection with respect to a fuel injection proportion by the main injection or
performs a premixed compression ignition combustion by carrying out only a preceding injection without carrying out the main injection at an operating region further on the low load side than the second specific region within the operating region on a relatively low-speed side.

2. The diesel engine for automobiles according to claim 1, further comprising:
EGR amount control part for adjusting an EGR gas amount in the cylinder,
wherein the EGR amount control part introduces the EGR gas into the cylinder at least at the specific region.

3. The diesel engine for automobiles according to claim 2, wherein the EGR amount control part adjusts an internal EGR gas amount by controlling an operation of at least one from among an intake valve and an exhaust valve in the engine main body.

4. The diesel engine for automobiles according to claim 1, wherein the injection control part prohibits the pre-injection serving as the preceding injection and performs the pilot injection, at an operating region on a higher load side than the specific region, or at an operating region on a relatively high speed side.

5. A control device of a diesel engine for automobiles,
wherein the diesel engine includes: an engine main body which is installed in an automobile, to which fuel having diesel oil as a main component is supplied, and in which a geometric compression ratio according to reciprocation between a top dead center and a bottom dead center of a piston that is insertion-fitted in a cylinder is set to 15 or less; and a fuel injection valve which is disposed facing into the cylinder and directly injects the fuel into the cylinder,
and wherein the control device comprises injection control means for controlling an injection mode of the fuel into the cylinder by the fuel injection valve,
the injection control part performs, at a specific region of predetermined load within an operating region on a relatively low-speed side at a time where the engine main body is warm:
a main injection of injecting fuel near a compression top dead center; and
a preceding injection of injecting fuel in a compression stroke prior to the main injection, and
the injection control part performs as the preceding injection:
a pilot injection of injecting fuel at a timing such that at least part of a fuel spray reaches outside a cavity sunk in a top face of the piston; and
a pre-injection of injecting fuel at a predetermined timing after the pilot injection, to suppress thereby ignition of the fuel injected by the pilot injection and shorten an ignition delay of the fuel injected by the main injection;
wherein the injection control part prohibits the pilot injection serving as the preceding injection and performs the pre-injection, at a second specific region adjacent to the specific region on a low load side within the operating region on a relatively low-speed side, and
wherein the injection control part
increases a fuel injection proportion by the preceding injection with respect to a fuel injection proportion by the main injection or
performs a premixed compression ignition combustion by carrying out only a preceding injection without carrying out the main injection at an operating region further on the low load side than the second specific region within the operating region on a relatively low-speed side.

6. A method for controlling a diesel engine for automobiles,
the diesel engine including: an engine main body which is installed in an automobile, to which fuel having diesel oil as a main component is supplied, and in which a geometric compression ratio according to reciprocation between a top dead center and a bottom dead center of a piston that is insertion-fitted in a cylinder is set to 15 or less; a fuel injection valve which is disposed facing into the cylinder and directly injects the fuel into the cylinder; and injection control part for controlling an injection mode of the fuel into the cylinder by the fuel injection valve,
the control method comprising:
a step in which the injection control part performs, at a specific region of predetermined load within an operating region on a relatively low-speed side at a time where the engine main body is warm:
a main injection of injecting fuel near a compression top dead center; and a preceding injection of injecting fuel in a compression stroke prior to the main injection step; and a step in which the injection control part performs as the preceding injection:

a pilot injection of injecting fuel at a timing such that at least part of a fuel spray reaches outside a cavity sunk in a top face of the piston; and a pre-injection of injecting fuel at a predetermined timing after the pilot injection, to suppress thereby ignition of the fuel injected by the pilot injection and shorten an ignition delay of the fuel injected by the main injection;

wherein the injection control part prohibits the pilot injection serving as the preceding injection and performs the pre-injection, at a second specific region adjacent to the specific region on a low load side within the operating region on a relatively low-speed side, and wherein the injection control part increases a fuel injection proportion by the preceding injection with respect to a fuel injection proportion by the main injection or performs a premixed compression ignition combustion by carrying out only a preceding injection without carrying out the main injection at an operating region further on the low load side than the second specific region within the operating region on a relatively low-speed side.

* * * * *